(No Model.)

E. THOMSON.
LIGHTNING ARRESTER.

No. 418,249. Patented Dec. 31, 1889.

Witnesses
Ira R. Steward
Wm N. Capel

Inventor
Elihu Thomson
By Attorney
H. C. Townsend

UNITED STATES PATENT OFFICE.

ELIHU THOMSON, OF LYNN, MASSACHUSETTS.

LIGHTNING-ARRESTER.

SPECIFICATION forming part of Letters Patent No. 418,249, dated December 31, 1889.

Application filed October 8, 1888. Serial No. 287,566. (No model.)

*To all whom it may concern:*

Be it known that I, ELIHU THOMSON, a citizen of the United States, and a resident of Lynn, in the county of Essex and State of Massachusetts, have invented a certain new and useful Safety Device for Electric Circuits, of which the following is a specification.

My present invention consists in a novel organization or combination of circuits and devices by which the ordinary lightning-arrester, consisting of two plates or electrodes of metal, one grounded and the other connected to the line and separated by a small interval, may be utilized without producing permanent arcs in the lightning arrester or permanent short-circuiting of the mains.

My invention consists, essentially, in rupturing the main or supply line or circuit the moment an arc forms between the plates of the lightning-arrester to ground by means of an electro-magnet or other device responsive to electric currents, which is placed in the ground branch, and which actuates or brings into action a suitable circuit-breaker in the electric line or circuit to which the lightning-arrester is connected as a branch.

Figure 1:
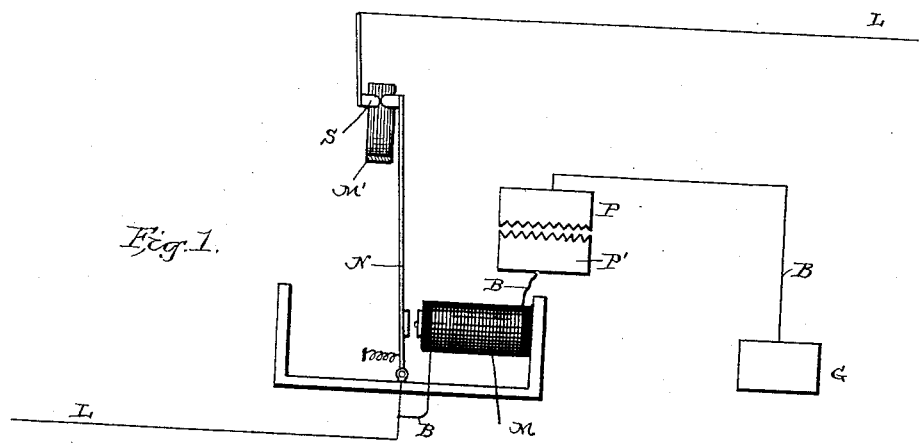
Figure 2:
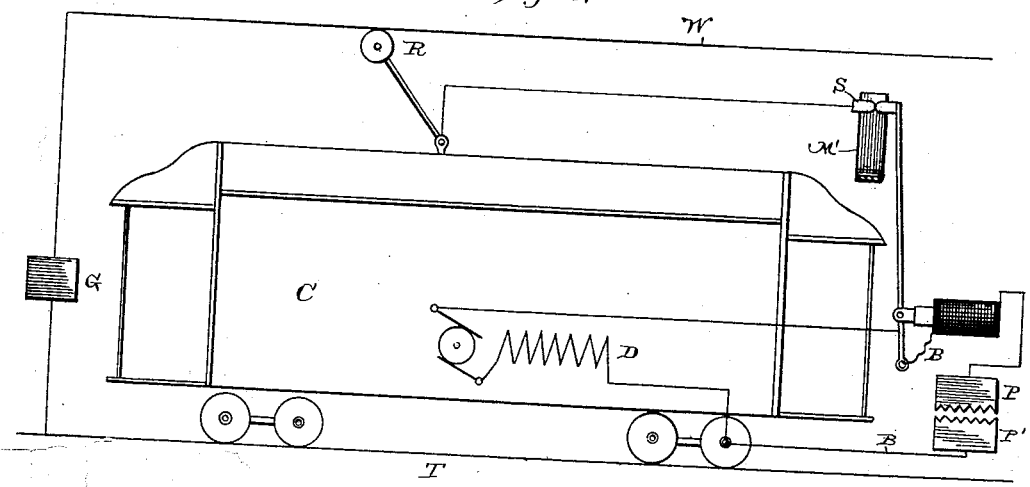

In the accompanying drawings, Figure 1 illustrates my invention diagrammatically. Fig. 2 illustrates the application of the invention to an electric railway.

In Fig. 1 a ground-plate or connection is indicated at G, while the plates or electrode of an ordinary lightning-arrester are indicated at P P'. The latter are shown as placed in the ordinary manner in a branch or ground connection B from a line or circuit L, which is a main line carrying a current or currents derived from a dynamo or other generator or from any other source. In the branch or ground connection, so as to be affected by an electric current flowing across the space between the electrodes P P', is an electro-magnet or other electro-responsive device M, which operates upon or controls the action of a circuit-breaker S or other device placed in the connections from the source to the point of connection of plate or electrode P P' and adapted to interrupt the current flowing to or from such source to the electrode. In the present instance I have shown the device S as consisting of a switch adapted to have its contacts separate a considerable distance, so as to insure the interruption of the arc between them, and thereby to effectually interrupt the flow of current from the source.

In order to secure the requisite amount of motion, a movable contact is mounted upon an extension of the armature-lever N of the electro-magnet. The switch at S is placed in the main or principal circuit L, as clearly shown, said circuit being continued through the armature-lever, although, as will be well understood by electricians, the circuit might be carried in other ways and an interruption of such main circuit secured by other forms of switch.

The operation is as follows: On the occurrence of a disruptive discharge over the branch B and across the space between the electrodes P P', followed by an arc between such points, the magnet M will be energized, and its armature, being drawn up, will open the contacts of the switch S, thereby breaking the main line and disconnecting the dynamo or other source from the arrester and magnet M. The arc across the electrodes P P' thereby ceases, and the magnet M also loses its power, so that the switch S, by the influence of the retractor for the armature-lever, is restored to its original condition. The device may obviously be applied to any electric circuit and will act in rupturing the circuit to prevent the continuance of an arc at the plates in the branch or ground connection.

In Fig. 2 an application of the invention to an electric railway is illustrated. G indicates any source of current, and W a feed line or wire parallel to the path of the car C or other vehicle to be driven by electricity. The parts are only illustrated diagrammatically, and the usual switching and other appliances for use in connection with an electric motor are not shown. The motor indicated at D derives its current through a roller R, carried by the car and making contact with the feed-line W. The return-circuit is supposed to be bp way of the rails T, upon which the vehicle moves. In the circuit or connection to the motor D is placed the circuit-interrupter S, while in the branch B from such circuit are placed the electrodes P P' of the lightning-arrester. The electro-magnet M is also placed in said branch, and its movable core N operates upon one of the contacts of the switch S in obvious manner. The various devices are to be mounted in any suitable manner known to electricians.

With the parts organized as shown a discharge from the line W—as, for instance, a lightning discharge, which might damage the motor D—will pass across the space between the electrodes P P' and through the magnet M, thereby causing the switch or circuit-breaker S to be opened if such discharge has resulted in the formation of an arc across the space B B' of the arrester. The switch S, being opened, breaks the circuit, with the result, as before explained, of stopping the arc. The opening of the circuit at the contacts of the switch S may be, if desired, assisted by means of a magnet indicated at M', applied in proximity to said contacts, or by the application of other devices known in the art.

What I claim as my invention is—

The combination, with an electric circuit and a branch or ground from the same containing electrodes placed in close proximity but separated from one another, of a circuit-breaker in the said circuit and an electro-magnet or other responsive device in the ground branch for controlling said circuit-breaker.

Signed at Lynn, in the county of Essex and State of Massachusetts, this 26th day of September, A. D. 1888.

ELIHU THOMSON.

Witnesses:
J. W. GIBBONEY,
GEO. E. EMMONS.